(12) United States Patent
Haddock

(10) Patent No.: US 6,948,764 B1
(45) Date of Patent: Sep. 27, 2005

(54) PROTECTIVE EQUIPMENT COVER SYSTEM

(76) Inventor: Denis Rene Haddock, RR 1, Site 11, Box 4, Morinville, Alberta (CA) T8R 1P4

( * ) Notice: Subject to any disclaimer, the term of this patent is extended or adjusted under 35 U.S.C. 154(b) by 0 days.

(21) Appl. No.: 10/792,940

(22) Filed: Mar. 3, 2004

(51) Int. Cl.⁷ .................................................. B60P 1/00
(52) U.S. Cl. ............................................... 296/136.07
(58) Field of Search ....................... 296/136.01, 136.07, 296/136.1; 52/DIG. 14; 150/166

(56) References Cited

U.S. PATENT DOCUMENTS

| | | | |
|---|---|---|---|
| 3,561,628 A | * | 2/1971 | Melin .......................... 414/664 |
| 3,698,409 A | | 10/1972 | Koontz et al. .................. 135/6 |
| 3,884,523 A | | 5/1975 | Allen .......................... 296/136 |
| 4,098,536 A | | 7/1978 | Mills .......................... 296/78 R |
| 4,322,107 A | * | 3/1982 | Ishizuka et al. ........ 296/146.11 |
| 4,652,037 A | | 3/1987 | Thau et al. .................. 296/78 R |
| 4,811,767 A | | 3/1989 | Kessler ........................ 150/154 |
| D307,347 S | * | 4/1990 | Gibson ........................ D34/35 |
| 5,193,724 A | | 3/1993 | Robbins ........................ 224/31 |
| 5,228,408 A | | 7/1993 | Jannausch .................... 114/361 |
| 5,394,821 A | | 3/1995 | Ziegler et al. .............. 114/219 |
| 5,445,200 A | | 8/1995 | Celestino et al. ........... 150/167 |
| 5,458,945 A | | 10/1995 | Tall ............................. 428/100 |
| 5,575,608 A | * | 11/1996 | Yau et al. .................... 414/607 |
| 5,618,159 A | | 4/1997 | Wilson ........................ 414/785 |
| 6,070,629 A | | 6/2000 | Whiteside .................... 150/166 |
| 6,129,408 A | | 10/2000 | Schultz et al. .............. 296/136 |
| 6,263,648 B1 | | 7/2001 | Carlson .......................... 56/1 |
| 6,298,991 B1 | | 10/2001 | Tsai ............................ 206/523 |

* cited by examiner

Primary Examiner—Dennis H. Pedder
(74) Attorney, Agent, or Firm—Gene Scott; Patent Law & Venture Group

(57) ABSTRACT

A protective cover apparatus system for a lift truck having a platform and mounted integrally thereon, an upper body superstructure having at least one of a rounded portion, a rectangular portion, and a box-shaped portion, the cover apparatus system made of a cushioned fabric and formed to cover at least one of the rounded portion, the rectangular portion and the box-shaped portion of the upper body superstructure of the lift truck. Hooks engage portions of the lift truck so as to maintain the cover thereon. The cover is symmetrical along a center line of the lift truck running from front to rear and a vertical seam is formed in the cover at the center line at the rearward termination of the cover so that the cover may be quickly and easily removed for access to the lift truck for maintenance.

8 Claims, 2 Drawing Sheets

PROTECTIVE EQUIPMENT COVER SYSTEM

BACKGROUND OF THE INVENTION

1. Incorporation by Reference

Applicant(s) hereby incorporate herein by reference, any and all U.S. patents, U.S. patent applications, and other documents and printed matter cited or referred to in this application.

2. Field of the Invention

This invention relates generally to covers for apparatus and machinery and more particularly to a cover system that is applicable to commercial warehouse lift trucks.

3. Description of Related Art

The following art defines the present state of this field:

Koontz et al., U.S. Pat. No. 3,698,409 describes a protective cover of flexible material such as canvas or duck that is mountable in raised position on a support to provide a top portion and depending portions covering and substantially enclosing an. area to be. protected: The depending portions may be adjustably positioned selectively to provide generally vertical openings in different parts of the cover. When in raised position, the cover material itself can be adjusted to provide a drainage gutter. The cover may also be conditioned for being mounted in unraised, substantially flat condition for protecting an unoccupied area, such as in a boat when moored or being transported. The cover may be set up to protect various other areas, such as on the ground, for example at a camp site.

Allen, U.S. Pat. No. 3,884,523 describes a protective covering for a vehicle of the motorcycle or motorbike type for protecting the vehicle from the elements when parked outside, the covering comprising a generally contoured cover of flexible material contained within a cover storage compartment in the vehicle seat and having a portion thereof permanently secured to the vehicle seat with the cover being readily withdrawn from a closable opening in the vehicle seat in a manner to completely overlie the vehicle to cover the same and protect the vehicle from the elements, the cover being readily foldable and collapsible into a compact package for reinsertion back into the vehicle seat storage compartment during times of usage of the vehicle such that the covering always remains fixedly attached to the vehicle seat and is readily adapted to be rapidly and conveniently spread over the entire vehicle whenever desired for protecting the vehicle.

Mills, U.S. Pat. No. 4,098,536 describes a flexible sheet of at least partially transparent, water repellent material is constructed to fit over the roof or canopy and sides of a golf cart for enclosure during inclement weather. An access is provided through the side wall for getting in and out of the cart and, when not in use, the weather shield may be removed from the cart, folded and stored in a pouch.

Thau et al., U.S. Pat. No. 4,652,037 describes a protective cover for the cab portion of a fork lift truck. The cab being defined by a frame having corner posts upstanding from the truck body and supporting the roof. The cover includes a top panel which overlies the roof and further includes front, rear, and side wall panels depending from the top panel secured thereto as well as to each other by edge seams. The side panels include roll up doors and the front and rear panels include windows. Flaps are provided over the windows. Straps depend from the top panel interiorly of the doors and flaps. The doors and flaps can be exteriorly rolled up with the straps wrapping around them and secured onto fasteners provided on the top panel so as to hold the doors and windows in an open condition.

Kessler, U.S. Pat. No. 4,811,767 describes a substantially weather-proof, protective cover which can be easily installed and removed and which is adapted to protect a swimming pool pump and filter assembly is provided. The cover is comprised of a plurality of separate pieces which when assembled and joined to each other form a unitary body which conforms substantially to the shape of the swimming pool pump and filter assembly. The cover includes: (1) a weather proof, outer layer, e.g., a marine vinyl layer which is sized to fit snugly around and substantially enclose the pump and filter assembly; (2) a mesh border affixed to the bottom edge of the outer layer; and (3) means located in the mesh border for securing the cover around the pump and filter assembly. The cover may also include: (4) sealable access means such as a zipper in the outer layer providing access to the pump and filter assembly.

Robbins, U.S. Pat. No. 5,193,724 describes a bag like main cover having side wall panels closed at the rear but open at the bottom and front. The top is closed from the rear to a point short of the front, leaving open top edges adjacent the front to fit around the upright gooseneck of the bicycle handlebars. Matching Velcro strips are attached to the side walls in the areas of the open portions thereof for releasably securing edges of the cover to lower portions of the bicycle and also to hold weather tight folds of the cover around the gooseneck. A hood-like auxiliary cover is shaped to releasably fit on and protect the handlebars and also receives the main cover therein for storing it when not in use. The auxiliary cover also has Velcro sealing strips that hold it on handlebars when in use and also strap it and the enclosed main cover to a bicycle portion when not in use.

Jannausch, U.S. Pat. No. 5,228,408 describes a boat cover assembly including a boat cover mounted to a plurality of posts assemblies. Each post assembly has a foot section, a post member, and a upper section. The upper section has a batten member mounted in a channel and extending laterally into sleeves sewn into the cover. The cover also has a chord in the hem line to tighten the cover about the boat hull below its rub line. Straps and are secured to cover and mounted about the underside of the hull and fastened together to secure the cover to the boat.

Tall, U.S. Pat. No. 5,458,945 describes a removable protective cover for a snowmobile including a sheet sized for enclosing a cowling of a snowmobile, the sheet having a top panel with a front panel, a rear panel, and a pair of side panels extended therefrom to define a hollow interior and a common bottom edge, the top panel having a opening formed thereon and an elastic band secured thereto about the periphery of the opening for holding the sheet about a windshield of a snowmobile, the rear panel having a large lower cut out formed thereon to create a pair of opposed lower corners and a small upper cut out extended upwards from the lower cut out to create a pair of upper corners, an upper rear edge extended between the upper corners, and a pair of opposed lower rear edges, the sheet further having a cable with an end located near an upper corner, another end located near the other upper corner, and an intermediate portion therebetween coupled to the lower rear edges and the bottom edge, and a cable securement mechanism for securing the ends of the cable in a closed loop configuration.

Ziegler et al., U.S. Pat. No. 5,394,821 describes a protective covering of a watercraft which is constructed of a thin, stretchable material that completely circumscribes the upper portion of the hull of the craft thereby protecting it from the elements and from damage from other watercraft and fixed objects such as boat docks. The protective covering is formed from a plurality of easily interconnected segments that can be compactly rolled or folded for ease of storage and transport. The covering is sleek and attractive, is light weight, floatable, durable in use, resists tearing and abrasion and effectively protects the craft from scratches, dings and dents when the craft comes into contact with other watercraft or with fixed objects.

Celestino et al., U.S. Pat. No. 5,445,200 describes a bicycle protective cover comprising of a fabric or plastic flexible material that conveniently and easily wraps around and completely encloses a bicycle. The cover is provided in a single piece having pockets contoured to comfortably fit the bicycle seat and the handlebars. Each of these pockets is closed by a hook and loop fastener. Circular portions at each end of the cover are provided with flexible elastic borders allowing them to be stretched around and retained on the front and rear wheels. The remaining panel of the cover then folds over the bicycle to completely seal and enclose the bicycle. The closing panel is provided with an elastic cord around the periphery of its border to draw the cover tight once it is completely wrapped around the bicycle. The cover includes webbing appropriately placed to aid in conveniently aligning the cover with the wheels, the seat, or the handlebars. The wheel covers are drawn around each side of the wheel and the closing panel installed by first installing the fitted pockets over the seat and the handlebars. The closing panel is then drawn tightly around the opposite side of the bicycle.

Wilson, U.S. Pat. No. 5,618,159 describes a protective guard for attachment to conventional lift trucks to prevent damage to transported materials caused by the hard surfaces and edges of lift forks which comprises a flexible sheet having cushioning characteristics and having a width sufficient in length to span and cover the lift forks. The protective guard further comprises hook and loop type fasteners for attaching the flexible sheet to the lift truck such that the sheet covers the potentially damaging lift forks and allows for lateral movement of the lift forks.

Whiteside, U.S. Pat. No. 6,070,629 describes a protective vehicle cover for protecting an outer surface of a vehicle from hail and other falling objects. The cover includes a flexible blanket having an inner ply, an outer ply and bubble-like air pockets which are sandwiched between the inner and outer plies. A fastener is provided for attaching the flexible blanket to the outer surface of the vehicle. Preferably, the air pockets are bubble-like spherical or hemispherical embossments formed on an inner ply of the blanket material, the pockets being generally circular in cross-section with an average maximum diameter of about 1.5 inches or less. An inner thin film plastic backing layer can be laminated to an intermediate film layer which has been embossed to form the air pockets therebetween with an outer cover layer being laminated to the emboss layer to provide an outer, decorative appearance for the vehicle cover.

Schultz et al., U.S. Pat. No. 6,129,408 describes a snowmobile cover with first and second receptacles for trapping water, snow, ice and dirt. The first receptacle is the cover as a whole wherein the cover forms a bowl like shape via an elastic cord housed in an endless sheath formed by and about the perimeter of the cover. As the cover is taken off the snowmobile, the cover is turned inside out, forming the bowl shape for containing the water, snow, ice and dirt. A second receptacle is a built in carrying bag for the receptacle. The cover (whether or not turned inside out) is rolled up into a bundle and the bundle is tucked inside of the bag for storage. If desired, water, snow, ice and dirt on the outside of the cover (or on the inside of the cover turned inside out) is also rolled up with the cover and retained within the built in bag. At a convenient location, instead of in the snowmobile trailer or in the garage, or when the snowmobiler has more time or is at a warmer location, the cover may be unraveled and turned right side out and shaken to clean the cover of melted snow and dirt. The cover further has a relatively large opening for the handlebars of the snowmobile to permit unrestricted access to the gas tank, controls and compartments. The cover further is tailored to fit the lines of a snowmobile by the inclusion of a relatively snug fit for the front of the machine, a relatively snug fit for the rear of the machine, and a tent like fit for the middle of the machine having protruding handlebars and windshield, where the tent like portion is later pinched down by a bungee cord.

Carlson, U.S. Pat. No. 6,263,648 describes a lawn tractor cover assembly comprising a tractor cover and a deck cover wherein the deck cover is removably attached to the tractor cover and the tractor cover has an elasticized skirt for holding the lawn tractor cover assembly to the lawn tractor.

Tsai, U.S. Pat. No. 6,298,991 describes a protective pouch having a closed cell foam padding and a casing enclosed around the closed cell foam padding. The configuration forms two opposing curved sidewalls. The protective pouch has a closing mechanism, which can be a flap extending from one sidewall and attached to the other sidewall. The pouch can be substantially fitted for a rectangular object so that when the object is inside said pouch, the object forms protective pockets between the sidewalls of the object and opposing sidewalls of the pouch.

Our prior art search with abstracts described above teaches protective covers for fork lift trucks, lawn tractors, lift truck forks, snowmobiles, vehicles, bicycles, watercraft, pumps, golf carts, and other machines and apparatus, but does not teach a lift truck cover system that is able to conform to a lift truck outer body configuration in a manner that tight fitting and yet easily removable for truck servicing. The present invention fulfills these needs and provides further related advantages as described in the following summary.

SUMMARY OF THE INVENTION

The present invention teaches certain benefits in construction and use which give rise to the objectives described below.

The present invention is a protective cover for a lift truck of the type used in warehouses and on loading docks for moving palettes of materials. Such lift trucks are often called by the names, "fork lifts," "fork lift trucks," and "hi-lows." The present invention applies to all such devices. The protective cover is used to prevent damage to the lift truck's outer surface and its sensitive electronic components within the factory supplied cover where spillage may occur, e.g., chemicals, etc. Spills often occur when such materials are moved by a fork lift truck or processed in its vicinity. A lift truck that will benefit from the invention may be of the type that the operator stands upon and rides, or may be of the type that is self-propelled but not ridden, or it may be of the type that is not be self propelled, requiring manual pulling or pushing. However, all such lift trucks have in common the use of a hydraulic system for raising a pair of horizontally disposed forks, so as to lift palettes of materials and merchandise, to hold them in the lifted position while the lift truck moves from one location to another, and to then lower them to the ground once again. All of such machinery is very well known in the art and have a wide variety of mechanical configurations and sizes. Generally, such lift trucks have a platform mounted on wheels for mobility, and extending upwardly from the platform, a body structure that contains operating mechanisms for raising and lowering the forks, and where self-propelled, for moving and steering the lift truck on the surface that it rests on; generally a warehouse's hard surfaced floor. In most configurations the body structure will have curved surfaces, flat surfaces and transition surfaces such as radii that join the curved and flat surfaces to one another. The protective cover provides tight fitting curved portions, flat portions and transition portions to cover the various outer surfaces of the lift truck with fidelity. The cover, being extensive and generally complex in form, further provides elastic portions, hooks, zippers and other means for attachment so as to hold tightly and securely to the lift truck.

A primary objective of the present invention is to provide an apparatus and method of use of such apparatus that yields advantages not taught by the prior art.

Another objective is to provide such an invention capable of covering the outer surface of a lift truck with a compliant and cushioning skin.

A further objective is to provide such an invention capable of being tight-fitting, durable and yet quite easily removed for servicing the lift truck.

A still further objective is to provide such an invention capable of applying to a wide range of lift trucks.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

The present invention is a protective cover apparatus and system for protecting the outer surfaces of a lift truck of the type used for moving merchandise in warehouses and on loading docks and platforms. Generally speaking, such lift trucks have a platform and mounted on the platform, a metal body housing operating gear and controls. The body of most lift trucks has rounded portions, flat portions and transition portions between the several surfaces, but all have in common, the upwardly depending body portion mounted on the platform portion.

Figure 1:
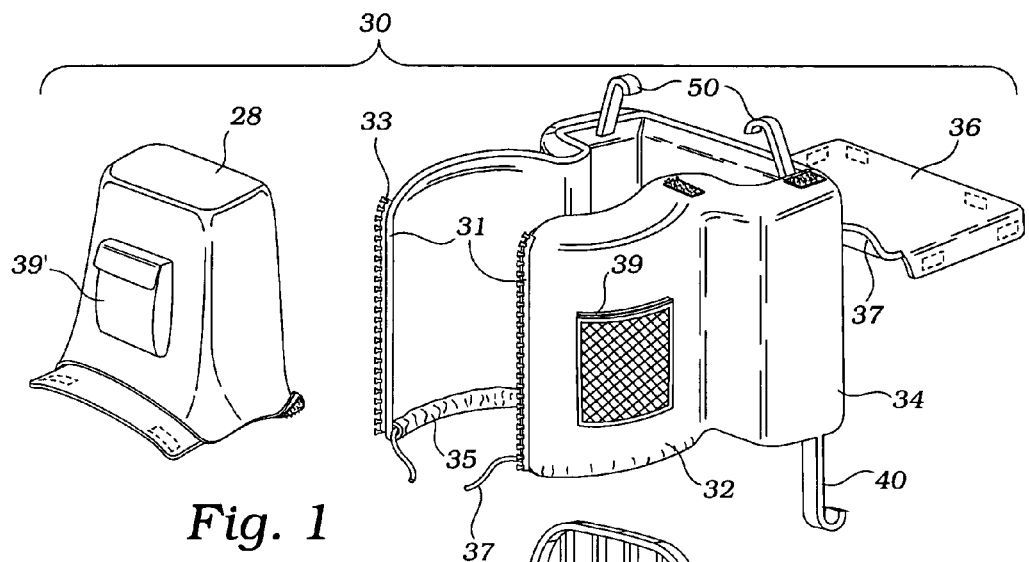
FIG. 1 is a perspective view of the invention.
Figure 2:
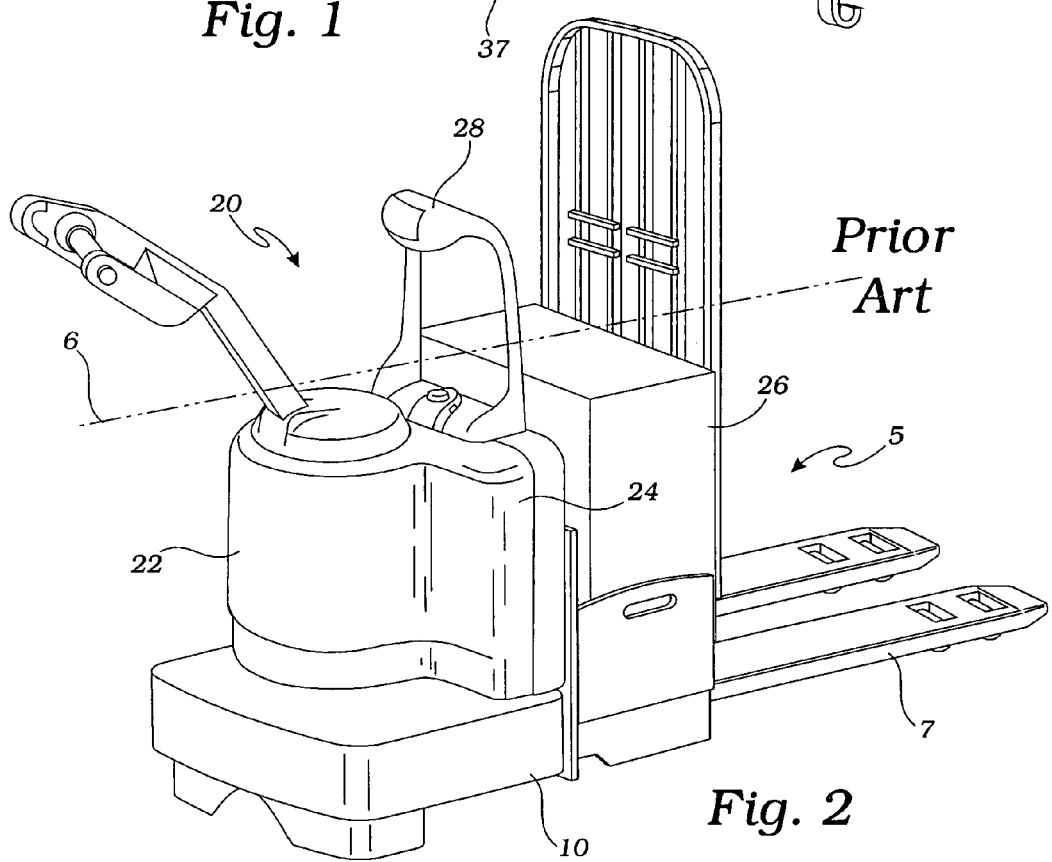
FIG. 2 is an perspective view of a prior art lift truck.
Figure 3:
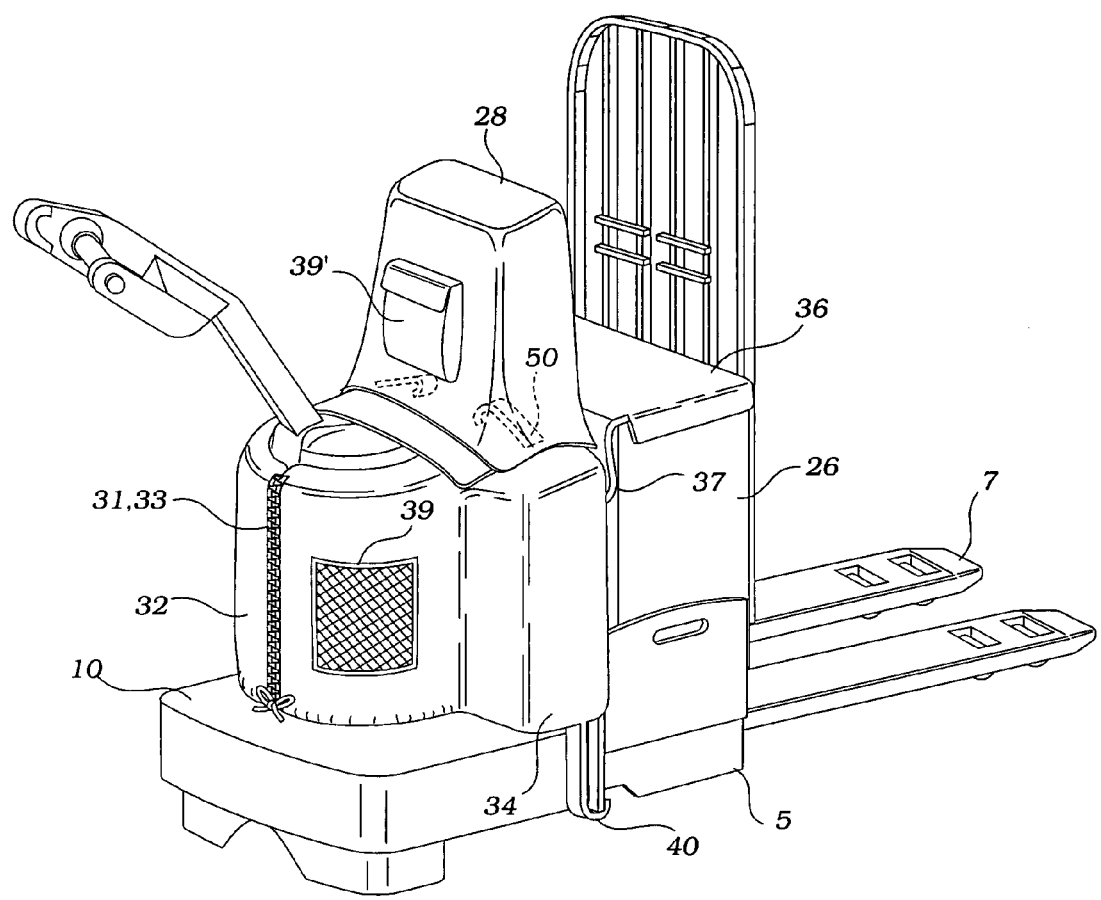
FIG. 3 is a perspective view of the invention as mounted on the lift truck.

In the present invention, an example of which is described here and shown in FIGS. 1–3, the lift truck 5 (Prior Art) has a platform 10, and mounted integrally thereon, an upper body 20 or superstructure of the lift truck 5. The upper body 20 includes a rounded portion 22, and extending forward of the rounded portion 22, a rectangular portion 24, and forward of the rectangular portion, a box-shaped portion 26, as shown in FIG. 2. However, such a lift truck may have some or all or none of these shapes, but may have shapes that are somewhat different or in a different order or positions. The present description is merely a description of but one possibility out of many. The protective cover 30, of a cushioning material or construction, comprises a rounded cover portion 32 tight-fitting over the rounded portion 22 of the upper body 20. A rectangular portion 34 of the cover 30 is tight-fitting over the rectangular portion 24 of the body 20, and a flat portion 36 of the cover 30 is tight-fitting over the box-shaped portion 26 of the upper body 20. The flat portion 36 of the cover 30 preferably is joined to the rectangular portion 34 by an expansion flap 37 that allows the box-shaped portion 26 to move over a vertical range as the lift truck 5 moves its forks 7 to lift a palette (not shown). The flat portion 36 may be held in place using magnets sewn into the material. A pair of downwardly depending hooks 40, positioned on either side of the cover 30 (one of the hooks 40 is hidden in FIG. 1, and a pair of upwardly depending hooks 50 are joined to the cover 30 and positioned for gripping portions of the lift truck 5. This is best seen in FIG. 3.

Preferably, the cover 30 is symmetrical along a center line 6 of the lift truck 5 that runs from front to rear of the lift truck 5. A vertical seam 31 is formed in the cover 30 at the center line at the rear terminal portion of the cover 30. This seam is joined by a fastener 33, preferably a heavy-duty zipper (shown), but may also be snaps, hooks, hook and loop material and other well known fasteners. The cover 30 may also provide one or more elastic seams 35 for tight fitting to contours of the lift truck 5. The cover 30 may also provide one or more draw strings 37 for improved tight fitting to contours of the lift truck 5, especially around corners and bends in the superstructure 20.

Some lift trucks 5 provide an upwardly extending control center 28 and the cover 30 may provide for this by applying a hood portion 28 that is tight fitting over the control center 28 of the lift truck 5 and secured to cover 30 as shown in FIG. 1. As shown in FIG. 1, utility pockets 39 and 39' may be provided one cover 30 for storing of tools and supplies, clip boards, etc. and for refuse.

The words used in this specification to describe the invention and its various embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of this described invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments below or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A protective cover apparatus system for a lift truck having a platform and mounted integrally thereon, an upper body superstructure having at least one of a rounded portion, a rectangular portion, and a box-shaped portion, the cover apparatus system comprising in combination: a cushioned fabric formed to cover at least one of the rounded portion, the rectangular portion and the box-shaped portion of the upper body superstructure of the lift truck; at least one downwardly depending hook and, in opposition thereto, at least one upwardly depending hook, the hooks positioned for engaging portions of the lift truck so as to maintain the cover thereon; the cover configured symmetrically along a center line of the lift truck running from front to rear thereof; a vertical seam formed in the cover at the center line at the rearward termination of the cover.

2. The apparatus of claim 1 wherein the seam is joined by a fastener.

3. The apparatus of claim 2 wherein the fastener is one of a zipper, snaps, hooks, and hook and loop material.

4. The apparatus of claim 1 wherein the cover provides at least one elastic seams positioned for tight fitting the cover to contours of the lift truck upper body superstructure.

5. The apparatus of claim 1 wherein the cover provides at least one draw string positioned for tight fitting the cover to contours of the lift truck upper body superstructure.

6. The apparatus of claim 1 further comprising an expansion flap extensive and positioned for enabling a portion of the apparatus to move vertically without removing a portion of the cover therefrom.

7. The apparatus of claim 1 further comprising a hood portion tight fitting over a control center upwardly extending from the upper body superstructure, the hood portion removably joined to the cover by a means for fastening.

8. The apparatus of claim 1 further comprising at least one utility pocket mounted on the cover.

\* \* \* \* \*